(12) United States Patent
Mundt

(10) Patent No.: US 12,118,281 B2
(45) Date of Patent: Oct. 15, 2024

(54) LCS ORCHESTRATOR DEVICE/EXPANSION DEVICE SECONDARY CIRCUIT BOARD SYSTEM

(71) Applicant: Dell Products L.P., Round Rock, TX (US)

(72) Inventor: Kevin Warren Mundt, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 276 days.

(21) Appl. No.: 17/834,055

(22) Filed: Jun. 7, 2022

(65) Prior Publication Data

US 2023/0394204 A1    Dec. 7, 2023

(51) Int. Cl.
*G06F 30/31* (2020.01)
*G06F 115/12* (2020.01)

(52) U.S. Cl.
CPC .......... *G06F 30/31* (2020.01); *G06F 2115/12* (2020.01)

(58) Field of Classification Search
CPC ................. G06F 30/31; G06F 2115/12; G06F 2213/0026
See application file for complete search history.

(56) References Cited

U.S. PATENT DOCUMENTS

| 7,562,174 B2 * | 7/2009 | Danilak | G06F 3/14 710/63 |
|---|---|---|---|
| 8,996,781 B2 | 3/2015 | Schuette et al. | |
| 9,846,657 B2 * | 12/2017 | Chang | G06F 13/22 |
| 10,210,128 B2 * | 2/2019 | Gay | G06F 13/426 |
| 10,398,032 B1 * | 8/2019 | Bailey | G06F 11/20 |
| 10,761,736 B2 * | 9/2020 | Osqueizadeh | G06F 3/068 |
| 10,956,353 B1 * | 3/2021 | Bailey | G06F 13/4068 |
| 2009/0248941 A1 * | 10/2009 | Morein | G06F 13/4004 710/308 |
| 2010/0088453 A1 * | 4/2010 | Solki | G06T 1/60 710/313 |
| 2011/0292058 A1 * | 12/2011 | Herr | G06T 19/006 345/520 |
| 2012/0311215 A1 * | 12/2012 | Cong | G06F 13/382 713/1 |

(Continued)

*Primary Examiner* — Nha T Nguyen
(74) *Attorney, Agent, or Firm* — Joseph Mencher

(57) ABSTRACT

An LCS orchestrator device/expansion device secondary circuit board system includes a secondary circuit board having an orchestrator connector subsystem connected to an orchestrator processing system that performs orchestration for an LCS. A primary connector on the secondary circuit board connects to a host processing system that provides an operating system for LCS, and is coupled via the secondary circuit board to a first orchestrator connector in the orchestrator connector subsystem to provide an orchestrator/host coupling used by the orchestrator processing system to provide a host endpoint to the host processing system. An expansion connector on the secondary circuit board connects to an expansion device that performs function(s) for the LCS, with the expansion connector coupled via the secondary circuit board to a second orchestrator connector in the orchestrator connector subsystem to provide an orchestrator/expansion coupling used by the expansion device to provide an orchestrator endpoint to the orchestrator processing system.

20 Claims, 12 Drawing Sheets

(56) References Cited

U.S. PATENT DOCUMENTS

2019/0056773 A1* 2/2019 Xiao .................. G06F 13/10
2020/0073840 A1* 3/2020 Mekad ............... G06F 13/4022
2021/0100066 A1* 4/2021 Braun ................. H04L 25/02

* cited by examiner

LCS ORCHESTRATOR DEVICE/EXPANSION DEVICE SECONDARY CIRCUIT BOARD SYSTEM

BACKGROUND

The present disclosure relates generally to information handling systems, and more particularly to a secondary circuit board for coupling a Logically Composed System (LCS) orchestrator device and an expansion device to a primary circuit board in an information handling system that provides an LCS.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

While conventional information handling systems such as, for example, server devices and/or other computing devices known in the art have traditionally been provided with particular information handling systems components that configure it to satisfy one or more use cases, new computing paradigms provide for the allocation of resources from information handling systems and/or information handling system components for use in Logically Composed Systems (LCSs) that may be composed as needed to satisfy any computing intent/workload, and then decomposed such that those resources may be utilized in other LCSs. As such, users of the LCSs may be provided with LCSs that meet their current needs for any particular workload they require.

For example, an LCS may be provided using a Bare Metal Server (BMS) system, with a processing system and memory system on a motherboard in the BMS system used to provide an Operating System (OS) for the LCS. One technique for providing such an LCS may include the use of an orchestrator device in the BMS system that operates to compose the LCS, as well as provide resource devices and their functionality to the OS in order to enable the performance of a variety of operations by the LCS. Furthermore, while the orchestrator device may couple the OS for the LCS to a variety of resource devices external to the orchestrator device, in many situations the orchestrator device may be configured with hardware and/or software to provide/perform functionality for the OS in the LCS as well. However, size constraints present issues with the ability to the configure orchestrator devices with all the functionality that an OS for an LCS might require.

One solution to such issues is the use of expansion devices such as expansion cards that are configured with the functionality required by the OS for the LCS. However, enabling such expanded functionality in conventional LCSs is accomplished via the coupling of the orchestrator device to the motherboard in the BMS system via a first riser card, and coupling the expansion device to the motherboard in the BMS via a second riser card, and then cabling together the orchestrator device and the expansion device. As will be appreciated by one of skill in the art in possession of the present disclosure, the cables required to cable the orchestrator device and the expansion device are relatively expensive, and process of cabling together the orchestrator device and the expansion device that are connected to separate riser cards in the BMS system is relatively physically difficult due to the physical constraints present in the BMS system, and typically requires disconnecting each of the orchestrator device and the expansion device from their respective riser cards, cabling them together, and then reconnecting them to those riser cards.

Accordingly, it would be desirable to provide an LCS orchestrator device/expansion device secondary circuit board system that addresses the issues discussed above.

SUMMARY

According to one embodiment, an Information Handling System (IHS) includes a primary circuit board including a host processing system that provides an operating system for a Logically Composed System (LCS); an orchestrator device including an orchestrator processing system that performs orchestration operations for the LCS; an expansion device that performs at least one function for the LCS; and a secondary circuit board that includes: an orchestrator connector subsystem that is connected to the orchestrator device; a primary connector that is connected to the primary circuit board and coupled via the secondary circuit board to a first orchestrator connector in the orchestrator connector subsystem to provide an orchestrator/host coupling used by the orchestrator processing system to operate as a host endpoint to the host processing system; and a first expansion connector that is connected to the expansion device and coupled via the secondary circuit board to a second orchestrator connector in the orchestrator connector subsystem to provide an orchestrator/expansion coupling used by the expansion device to operate as an orchestrator endpoint to the orchestrator processing system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
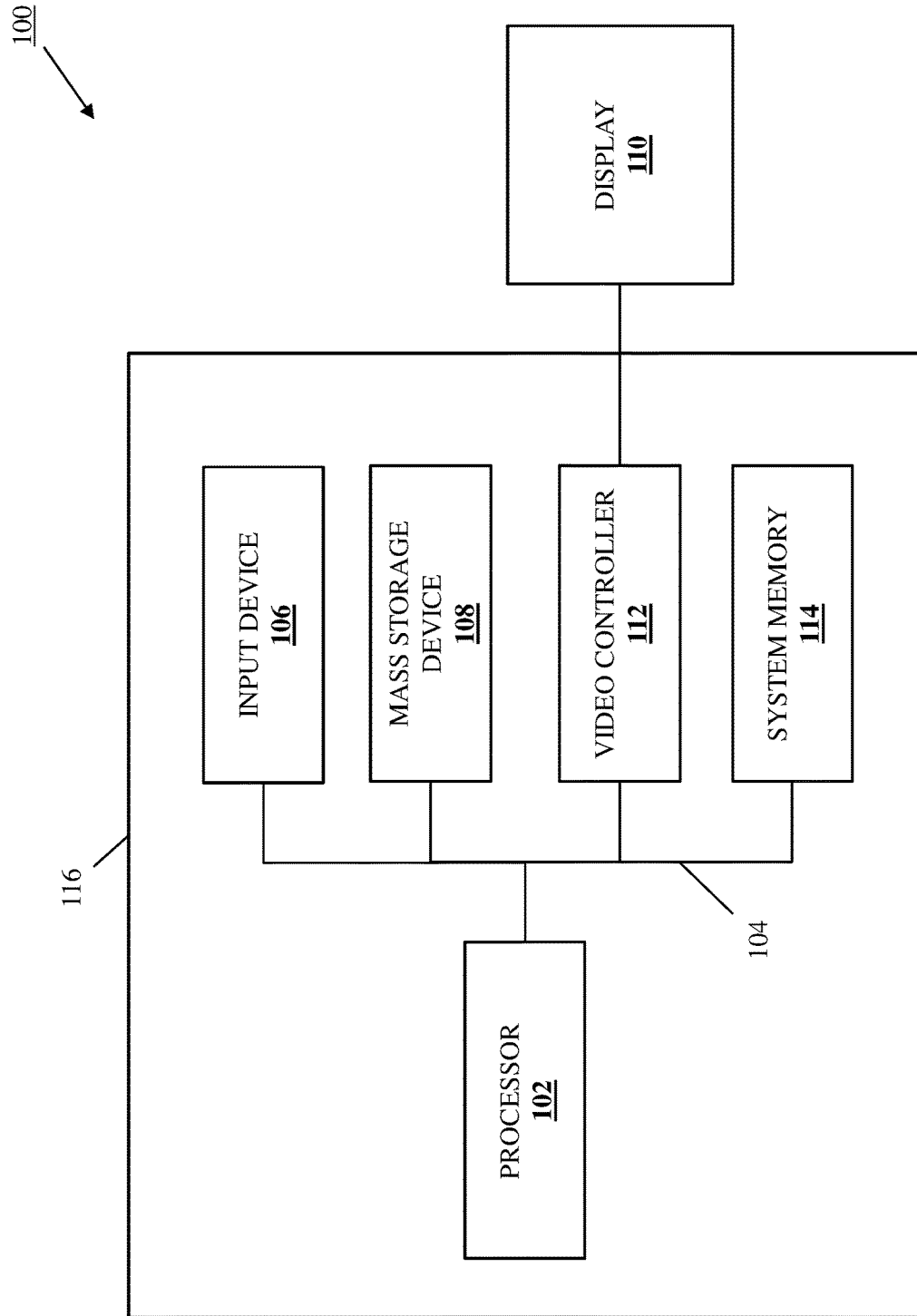
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the Logically Composed Systems (LCS) orchestrator device/expansion device secondary circuit board systems and methods of the present disclosure may be utilized with LCSs, which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
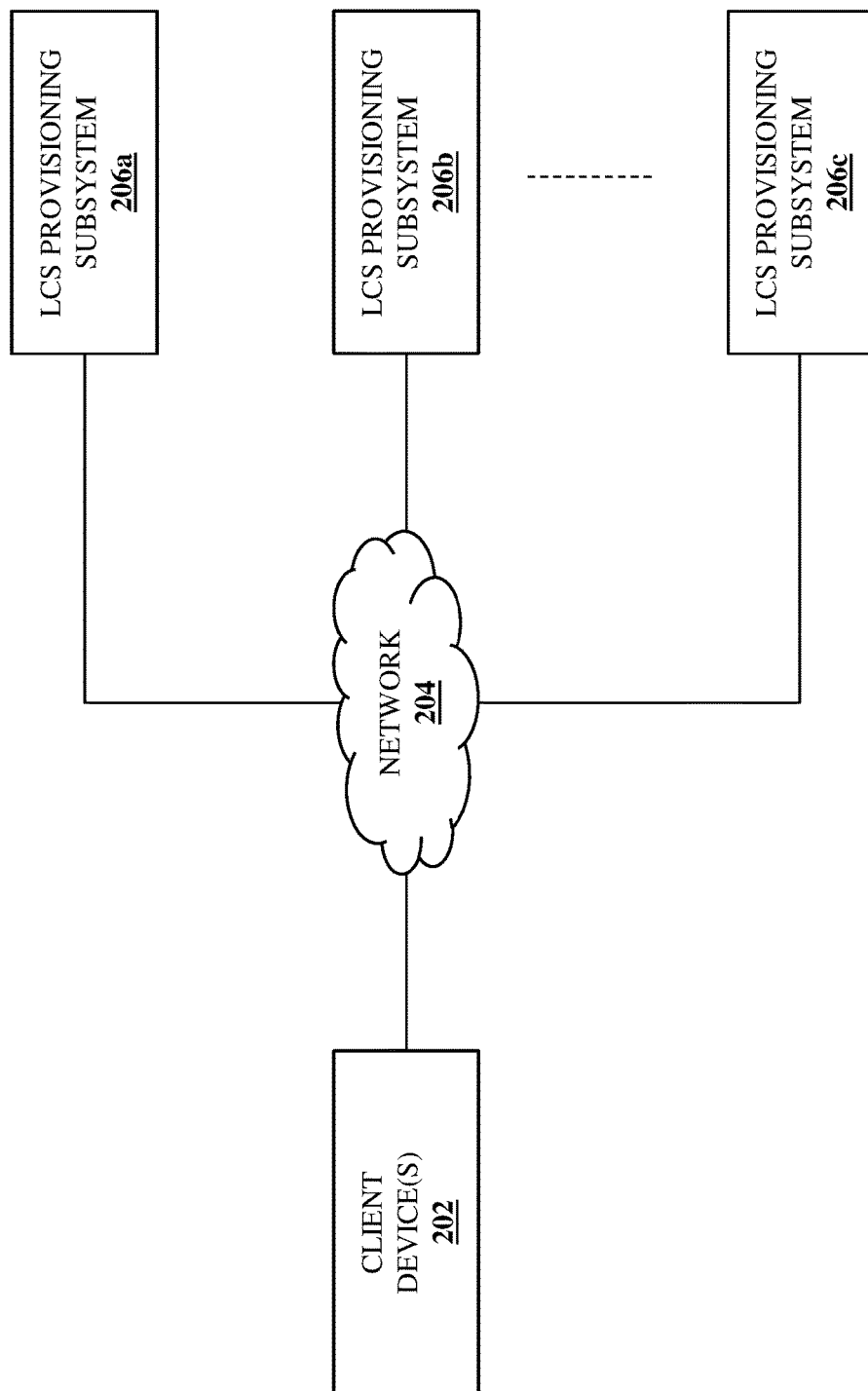
FIG. 2 is a schematic view illustrating an embodiment of an LCS provisioning system.

With reference to FIG. 2, an embodiment of an LCS provisioning system 200 is illustrated that may be utilized with the LCS orchestrator device/expansion device secondary circuit board systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206a, 206b, and up to 206c are coupled to the network 204 such that any or all of those LCS provisioning subsystems 206a-206c may provide LCSs to the client device(s) 202 as discussed in further detail below. In an embodiment, any or all of the LCS provisioning subsystems 206a-206c may include one or more of the IHS 100 discussed above with reference to FIG. 1 and/or may include some or all of the components of the IHS 100. For example, in some of the specific examples provided below, each of the LCS provisioning subsystems 206a-206c may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206a-206c) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
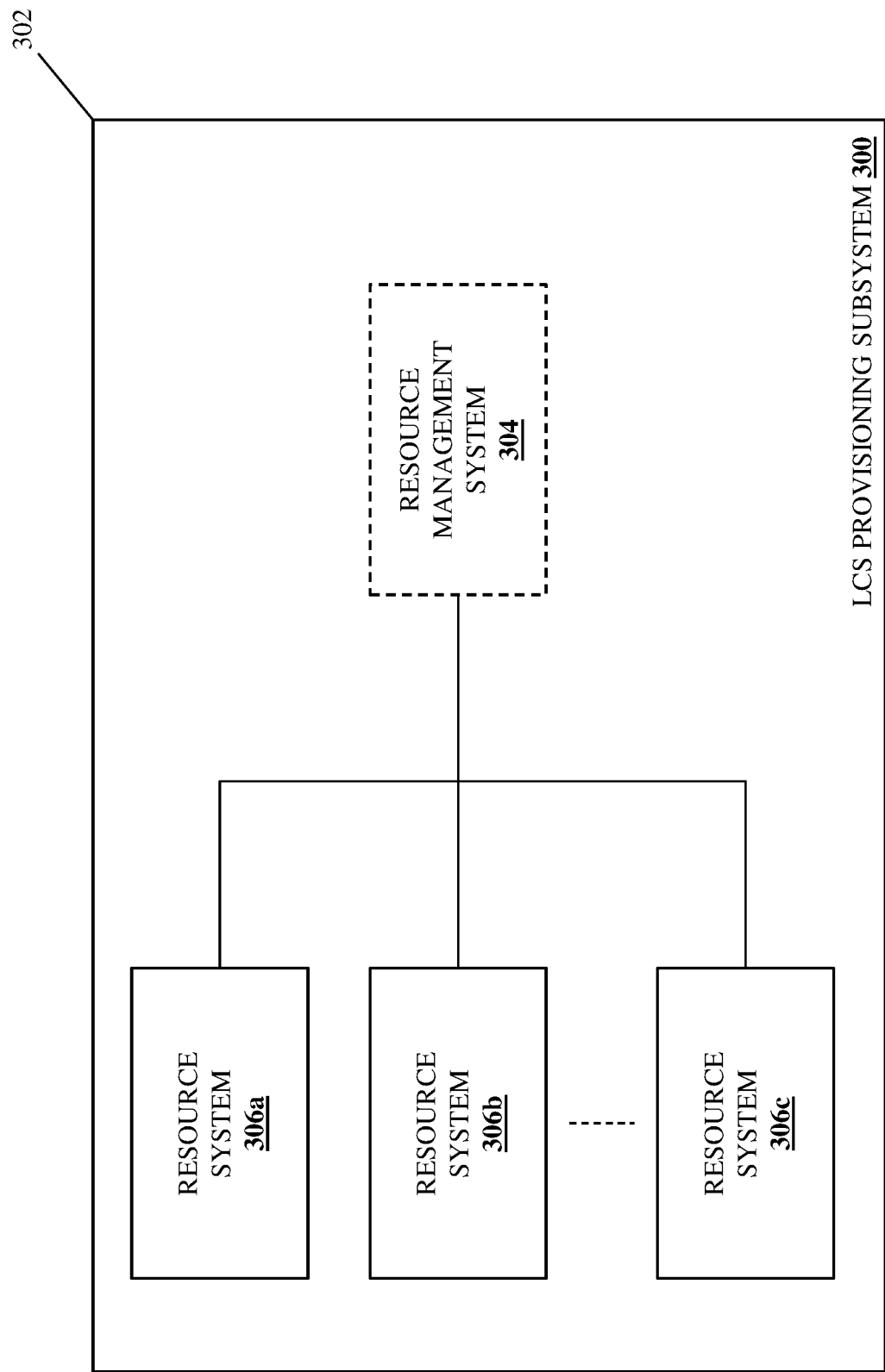
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206a-206c discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302, and includes a resource management system 304 coupled to a plurality of resource systems 306a, 306b, and up to 306c. In an embodiment, any of the resource management system 304 and the resource systems 306a-306c may be provided by the IHS 100 discussed above with reference to FIG. 1 and/or may include some or all of the components of the IHS 100. In the specific embodiments provided below, each of the resource management system 304 and the resource systems 306a-306c may include an orchestrator device. In some embodiments, the orchestrator device may be provided by the System Control Processor (SCP) device or Data Processing Unit (DPU) device discussed below, which may be conceptualized as an "enhanced" SmartNIC device that may be configured to perform functionality that is not available in conventional SmartNIC devices such as, for example, the resource management functionality, LCS provisioning functionality, and/or other SCP/DPU functionality described herein.

In an embodiment, any of the resource systems 306a-306c may include any of the resources described below coupled to an SCP device or DPU device that is configured to facilitate management of those resources by the resource management system 304. Furthermore, the SCP device or DPU device included in the resource management system 304 may provide an SCP Manager (SCPM) subsystem or DPU Manager (DPUM) subsystem that is configured to manage the SCP devices or DPU devices in the resource systems 306a-306c, and that performs the functionality of the resource management system 304 described below. In some examples, the resource management system 304 may be provided by a "stand-alone" system (e.g., that is provided in a separate chassis from each of the resource systems 306a-306c), and the SCPM subsystem or DPUM subsystem discussed below may be provided by a dedicated SCP device, DPU device, processing/memory resources, and/or other components in that resource management system 304. However, in other embodiments, the resource management system 304 may be provided by one of the resource systems 306a-306c (e.g., it may be provided in a chassis of one of the resource systems 306a-306c), and the SCPM subsystem or DPUM subsystem may be provided by an SCP device, DPU device, processing/memory resources, and/or any other any other components in that resource system.

As such, the resource management system 304 is illustrated with dashed lines in FIG. 3 to indicate that it may be a stand-alone system in some embodiments, or may be provided by one of the resource systems 306a-306c in other embodiments. Furthermore, one of skill in the art in possession of the present disclosure will appreciate how SCP devices or DPU devices in the resource systems 306a-306c may operate to "elect" or otherwise select one or more of those SCP devices or DPU devices to operate as the SCPM subsystem or DPUM subsystem that provides the resource management system 304 described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
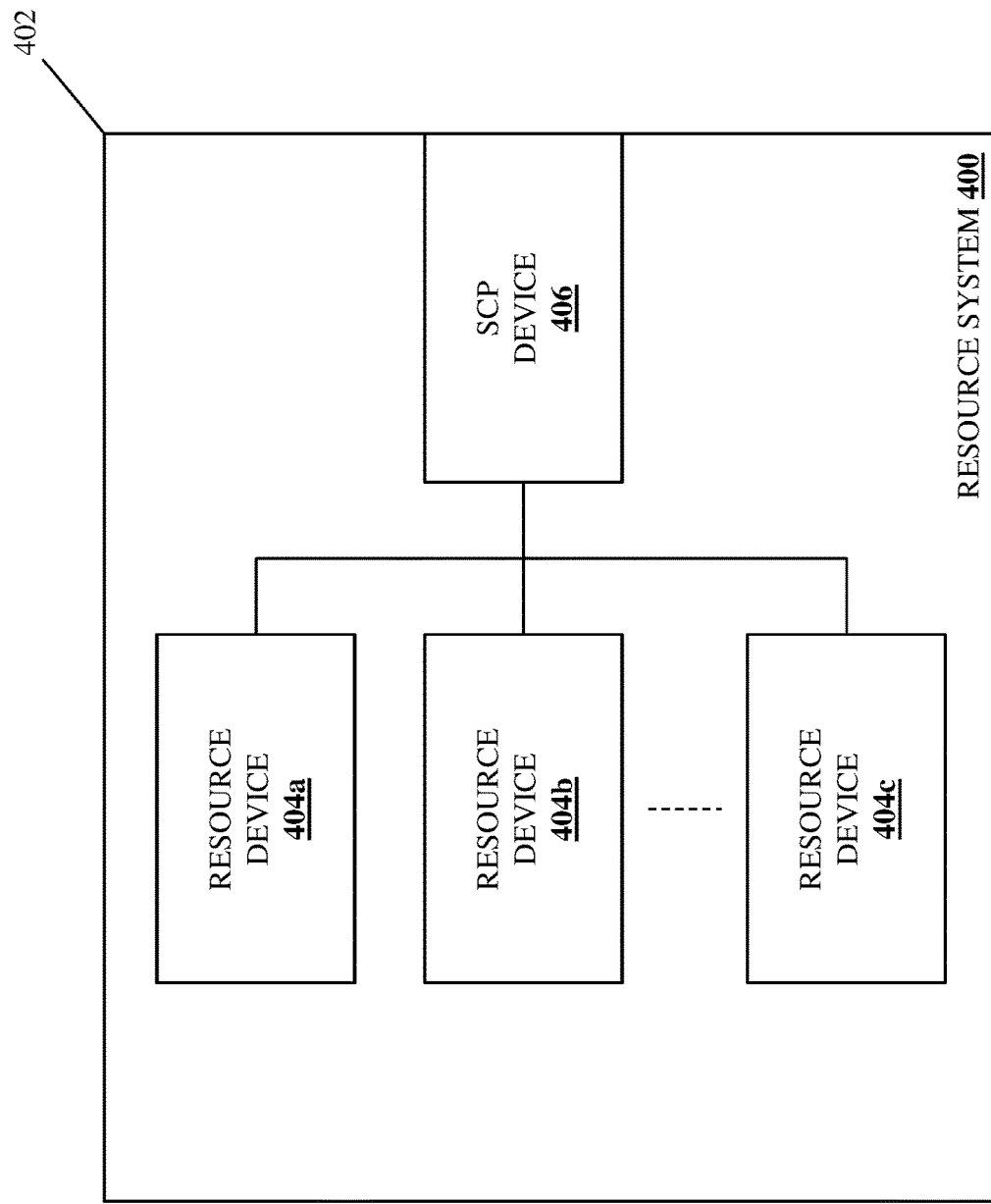
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306a-306c discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406, but one of skill in the art in possession of the present disclosure will appreciate how the SCP device 406 may be replaced by the DPU device described herein while remaining within the scope of the present disclosure, with that DPU device provided by BLUEFIELD® DPU devices available from NVIDIA® Corporation of Santa Clara, California, United States, DPU devices available from FUNGIBLE® Inc. of Santa Clara, California, United States, and/or other DPU devices known in the art.

In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404a, 404b, and up to 404c, each of which is coupled to the SCP device 406. For example, the resource devices 404a-404c may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM) devices (e.g., solid state byte-addressable memory devices that reside on a memory bus), etc.); storage devices (e.g., Non-Volatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404a-404c discussed below. As such, the resource devices 404a-404c in the resource systems 306a-306c/400 may be considered a "pool" of resources that are available to the resource management system 304 for use in composing LCSs.

To provide a specific example, the SCP devices described herein may provide a "trusted" orchestrator device that operates as a Root-of-Trust (RoT) for their corresponding resource devices/systems, to provide an intent management engine for managing the workload intents discussed below, to perform telemetry generation and/or reporting operations for their corresponding resource devices/systems, to perform identity operations for their corresponding resource devices/systems, provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. For example, the SCP device 406 may be "trusted" because it provides a root-of-trust for its corresponding resource devices/systems, and thus may be configured with restricted access to its hardware and/or software that has been validated and is maintained within a closed-loop infrastructure. For example, the SCP device 704 may run cryptographically signed software validated via the root-of-trust, with connectivity to both a BMS BMC and the SCPM device discussed above, and with all communications internal to the closed-loop infrastructure secured to ensure their veracity.

To contrast, the DPU device described herein may provide an "untrusted" orchestrator device that may include similar hardware/software/capabilities as the SCP device 406, but a user of the SCP device 406 may not be able to access such hardware/software/capabilities on the SCP device 406 unless it is part of/connected to an authorized network. As will be appreciated by one of skill in the art in possession of the present disclosure, the DPU device may be "untrusted" due to it having not been manufactured by a manufacturer of the computing system 202 (e.g., it may be obtained by the manufacturer of the computing system 202 from any of a variety of vendors that are not controlled by the manufacturer of the computing system 202), it having not been secured based on a lack of control over the DPU device 204 by a manufacturer of the computing system 202, and/or based on other "untrusted" factors that would be apparent to one of skill in the art in possession of the present disclosure. As will be appreciated by one of skill in the art in possession of the present disclosure, a DPU device software stack differs from a conventional Input/Output (IO) card that uses firmware configured to provide dedicated I/O and management functions, as in addition to firmware, the DPU device software stack will include a DPU operating system and a user space that is customizable to configure/program the DPU device to present resource devices to an operating system in the computing system 202 outside the control of the manufacturer of the computing system, which can render that DPU device "untrusted" in many scenarios.

As discussed below, the SCP devices and/or DPU devices described herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. Thus, while an SCP device is illustrated and described as performing the functionality discussed below, one of skill in the art in possession of the present disclosure will appreciated that functionality described herein may be enabled on the DPU devices discussed above, as well as other devices with similar functionality, while remaining within the scope of the present disclosure as well.

Thus, the resource source system 400 may include the chassis 402 including the SCP device 406 connected to any combinations of resource devices. To provide a specific embodiment, the resource system 400 may provide a "Bare Metal Server" that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404a-404c. For example, the chassis 402 of the resource system 400 may house a plurality of processing systems (i.e., the resource devices 404a-404c) coupled to the SCP device 406. In another example, the chassis 402 of the resource system 400 may house a plurality of memory systems (i.e., the resource devices 404a-404c) coupled to the SCP device 406. In another example, the chassis 402 of the resource system 400 may house a plurality of storage devices (i.e., the resource devices 404a-404c) coupled to the SCP device 406. In another example, the chassis 402 of the resource system 400 may house a plurality of networking devices (i.e., the resource devices 404a-404c) coupled to the SCP device 406. However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404a-404c for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404a-404c while remaining within the scope of the present disclosure as well.

Figure 5:
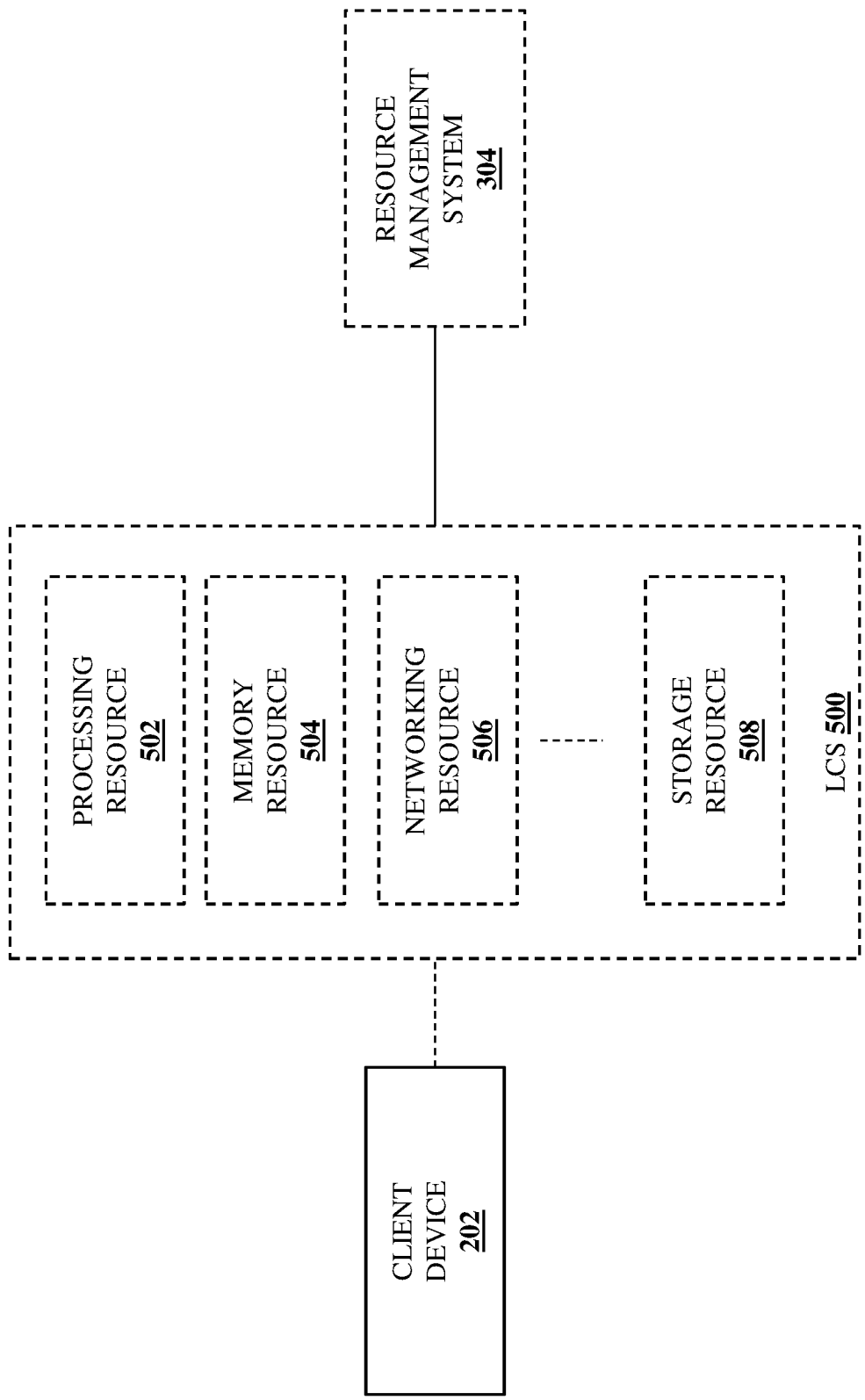
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that user would like to perform (e.g., "I need an LCS with 10 gigahertz (Ghz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TBs of Accelerator PMEM memory capacity"). As will be appreciated by one of skill in the art in possession of the present disclosure, the workload intent discussed above may be provided to one of the LCS provisioning subsystems 206a-206c, and may be satisfied using resource systems that are included within that LCS provisioning subsystem, or satisfied using resource systems that are included across the different LCS provisioning subsystems 206a-206c.

As such, the resource management system 304 in the LCS provisioning subsystem that received the workload intent may operate to compose the LCS 500 using resource devices 404a-404c in the resource systems 306a-306c/400 in that LCS provisioning subsystem, and/or resource devices 404a-404c in the resource systems 306a-306c/400 in any of the other LCS provisioning subsystems. FIG. 5 illustrates the LCS 500 including a processing resource 502 allocated from one or more processing systems provided by one or more of the resource devices 404a-404c in one or more of the resource systems 306a-306c/400 in one or more of the LCS provisioning subsystems 206a-206c, a memory resource 504 allocated from one or more memory systems provided by one or more of the resource devices 404a-404c in one or more of the resource systems 306a-306c/400 in one or more of the LCS provisioning subsystems 206a-206c, a networking resource 506 allocated from one or more networking devices provided by one or more of the resource devices 404a-404c in one or more of the resource systems 306a-306c/400 in one or more of the LCS provisioning subsystems 206a-206c, and/or a storage resource 508 allocated from one or more storage devices provided by one or more of the resource devices 404a-404c in one or more of the resource systems 306a-306c/400 in one or more of the LCS provisioning subsystems 206a-206c.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306a-306c/400 that allocate any of the resource devices 404a-404c that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 Ghz of processing power and 8 GB of memory capacity for an application with 20 TB of high-performance protected object storage for use with a hospital-compliant network, the processing resources 502 in the LCS 500 may be configured to utilize 10 Ghz of processing power from processing systems provided by resource device(s) in the resource system(s), the memory resources 504 in the LCS 500 may be configured to utilize 8 GB of memory capacity from memory systems provided by resource device(s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TBs of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508, if needed.

Figure 6:
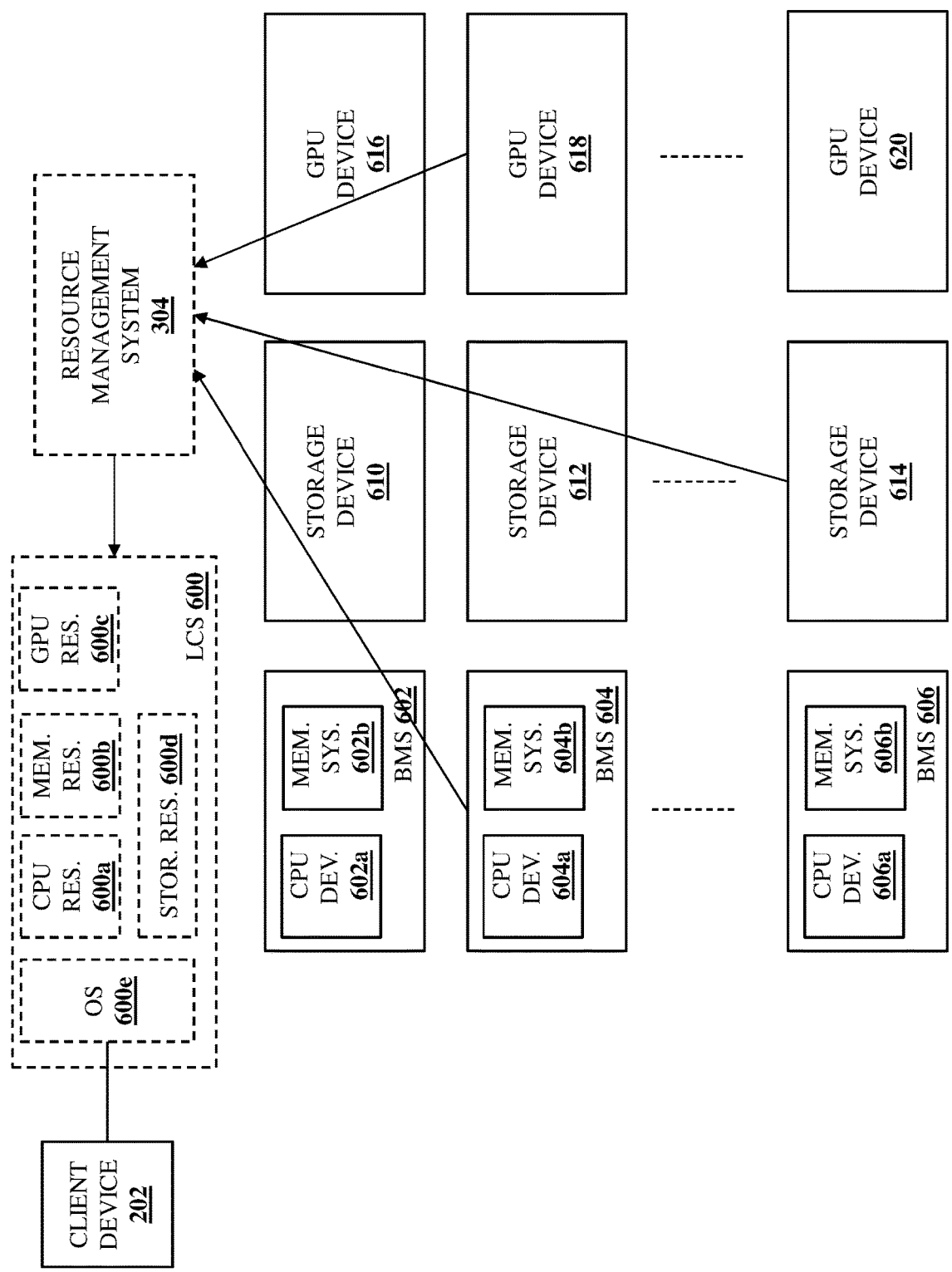
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306a-306c available to the resource management system 304 include a Bare Metal Server (BMS) 602 having a Central Processing Unit (CPU) device 602a and a memory system 602b, a BMS 604 having a CPU device 604a and a memory system 604b, and up to a BMS 606 having a CPU device 606a and a memory system 606b. Furthermore, one or more of the resource systems 306a-306c includes resource devices 404a-404c provided by a storage device 610, a storage device 612, and up to a storage device 614. Further still, one or more of the resource systems 306a-306c includes resource devices 404a-404c provided by a Graphics Processing Unit (GPU) device 616, a GPU device 618, and up to a GPU device 620.

FIG. 6 illustrates how the resource management system 304 may compose the LCS 600 using the BMS 604 to provide the LCS 600 with CPU resources 600a that utilize the CPU device 604a in the BMS 604, and memory resources 600b that utilize the memory system 604b in the BMS 604. Furthermore, the resource management system 304 may compose the LCS 600 using the storage device 614 to provide the LCS 600 with storage resources 600d, and using the GPU device 318 to provide the LCS 600 with GPU resources 600c. As illustrated in the specific example in FIG. 6, the CPU device 604a and the memory system 604b in the BMS 604 may be configured to provide an operating system 600e that is presented to the client device 202 as being provided by the CPU resources 600a and the memory resources 600b in the LCS 600, with operating system 600e utilizing the GPU device 618 to provide the GPU resources 600c in the LCS 600, and utilizing the storage device 614 to provide the storage resources 600d in the LCS 600. The user of the client device 202 may then provide any application(s) on the operating system 600e provided by the CPU resources 600a/CPU device 604a and the memory resources 600b/memory system 604b in the LCS 600/BMS 604, with the application(s) operating using the CPU resources 600a/CPU device 604a, the memory resources 600b/memory system 604b, the GPU resources 600c/GPU device 618, and the storage resources 600d/storage device 614.

Furthermore, as discussed above, the SCP device(s) 406 in the resource systems 306a-306c/400 that allocates any of the CPU device 604a and memory system 604b in the BMS 604 that provide the CPU resource 600a and memory resource 600b, the GPU device 618 that provides the GPU resource 600c, and the storage device 614 that provides storage resource 600d, may also allocate SCP hardware and/or perform enhanced functionality (e.g., the enhanced storage functionality in the specific examples provided above) for any of those resources that may otherwise not be available in the CPU device 604a, memory system 604b, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600c may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600a, the memory resources 600b, the GPU resources 600c, and the storage resources 600d, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being under-utilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in same manner as they would physical system at their location having those same resources.

Figure 7:
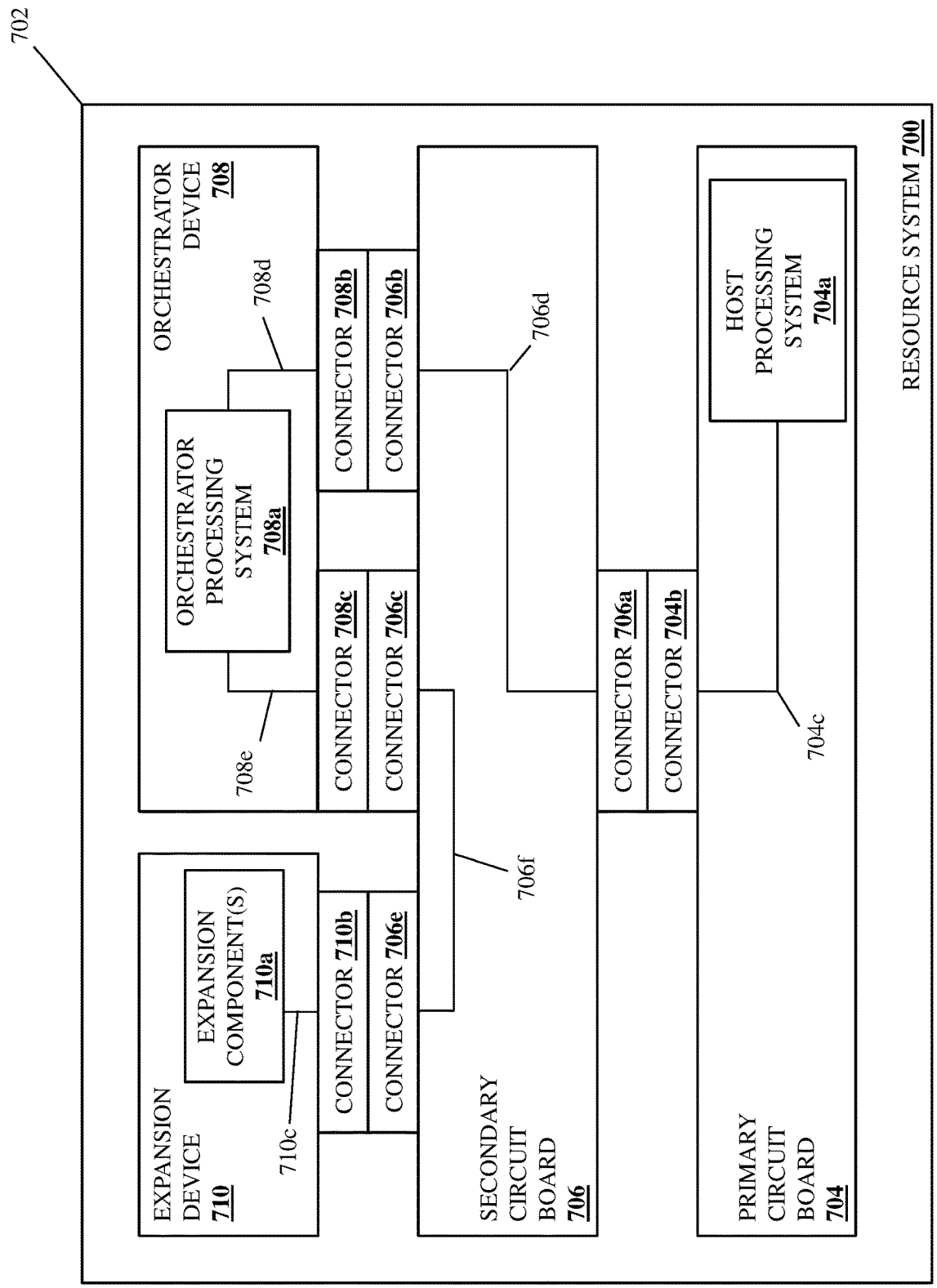
FIG. 7 is a schematic view illustrating an embodiment of the resource system of FIG. 4 including the LCS orchestrator device/expansion device secondary circuit board system of the present disclosure.

Referring now to FIG. 7, an embodiment of a resource system 700 is illustrated that may provide the resource system 400 discussed above with reference to FIG. 4, and that is configured to provide the LCS orchestrator device/expansion device secondary circuit board system of the present disclosure. As such, the resource system 700 may be provided by the IHS 100 discussed above with reference to FIG. 1 and/or may include some or all of the components of the IHS 100, and in specific examples may be provided by a BMS system as described above. However, while illustrated and discussed as being provided by a BMS system, one of skill in the art in possession of the present disclosure will recognize that the functionality of the resource system 700 discussed below may be provided by other systems that are configured to operate similarly as the resource system 700 discussed below. In the illustrated embodiment, the resource system 700 includes a chassis 702 that houses the components of the resource system 700, only some of which are illustrated and described below.

For example, the chassis 702 may house a primary circuit board 704 that includes a host processing system 704a that one of skill in the art in possession of the present disclosure will appreciate may be utilized as discussed above to provide an operating system for an LCS. In a specific example, the primary circuit board 704 may be provided by a motherboard, with the host processing system 704a provided by a x86 Central Processing Unit (CPU), although other circuit boards and/or host processing systems will fall within the scope of the present disclosure as well. In the illustrated embodiment, a connector 704b is included on the primary circuit board 704, and in specific examples may be provided by a Peripheral Component Interconnect express (PCIe) connector that is mounted to the primary circuit board 704 and coupled via circuit board traces 704c in the primary circuit board 704 to the host processing system 704a. In the embodiments described below, the connector 704b is described as being provided by a x8 connector, although one of skill in the art in possession of the present disclosure will appreciate how "smaller" connectors (e.g., x4) or "larger" connectors (e.g., x16, x32, etc.) may be implemented as the connector 704b according to the teachings of the present disclosure while remaining within its scope.

In an embodiment, the chassis 702 may house a secondary circuit board 706 that, in the examples below, is described as a riser card, but that one of skill in the art in possession of the present disclosure will appreciate may be provided by other circuit boards that are configured similarly as the secondary circuit board 706 described herein. The secondary circuit board 706 includes a "primary" connector 706a that is configured to connect to the connector 704b on the primary circuit board 704, and in specific examples may be provided by a PCIe connector that extends from the secondary circuit board 706. In the embodiments described below, the primary connector 706a is a x8 connector, although one of skill in the art in possession of the present disclosure will appreciate how "smaller" connectors (e.g., x4) or "larger" connectors (e.g., x16, x32, etc.) may be implemented as the primary connector 706a according to the teachings of the present disclosure while remaining within its scope.

The secondary circuit board 706 also includes an orchestrator connector subsystem that, in the examples provided herein, include a pair of "orchestrator" connectors 706b and 706c that are configured to connect to the orchestrator device 708 discussed below, and in specific examples may be provided by PCIe connector(s) that is/are mounted to the secondary circuit board 706, with the orchestrator connector 706b coupled via circuit board traces 706d in the secondary circuit board 706 to the primary connector 706a. In the embodiments described below, the orchestrator connector subsystem is a x16 connector that has been bifurcated to provide two x8 connections that provide the orchestrator connectors 706b and 706c, although one of skill in the art in possession of the present disclosure will appreciate how "smaller" connectors (e.g., x8 or x4) or "larger" connectors (e.g., x32, x64, etc.) may be implemented as the orchestrator connector subsystem and bifurcated (or provided as separate connectors) according to the teachings of the present disclosure while remaining within its scope.

The secondary circuit board 706 also includes an "first expansion" connector 706e that is configured to connect to the expansion device 710 discussed below, and in specific examples may be provided by a PCIe connector that is mounted to the secondary circuit board 706, with the orchestrator connector 706c and the first expansion connector 706e coupled together via circuit board traces 706f in the secondary circuit board 706. In the embodiments described below, the first expansion connector 706e is a x8 connector, although one of skill in the art in possession of the present disclosure will appreciate how "smaller" connectors (e.g., x4) or "larger" connectors (e.g., x16, x32, etc.) may be implemented as the first expansion connector 706e according to the teachings of the present disclosure while remaining within its scope.

In an embodiment, the chassis 702 may house an orchestrator device 708 that may provide any of the SCP devices (e.g., the SCP device 406 discussed above with reference to FIG. 4), DPU devices, and/or other orchestrator devices discussed herein that are configured to perform orchestration operations for an LCS. FIG. 7 illustrates the orchestrator device 708 including an orchestrator processing system 708a, but as discussed above the orchestrator device 708 may include any of a variety of hardware/components to provide any of a variety of orchestrator functionality that would be apparent to one of skill in the art in possession of the present disclosure. The orchestrator device 708 also includes a connector subsystem that, in the examples provided herein, include a pair of connectors 708b and 708c that are configured to connect to the orchestrator connector subsystem (e.g., the orchestrator connectors 706b and 706c, respectively) on the secondary circuit board 706. In specific examples, the connector subsystem on the orchestrator device 708 may be provided by PCIe connector(s) that extend from a circuit board in the orchestrator device 708, with the connector 708b coupled via circuit board traces 708d in the circuit board in the orchestrator device 708 to the orchestrator processing system 708a, and the connector 708c coupled via circuit board traces 708e in the circuit board in the orchestrator device 708 to the orchestrator processing system 708a. In the embodiments described below, each of the connectors 708b and 708c is a x8 connector, although one of skill in the art in possession of the present disclosure will appreciate how "smaller" connectors (e.g., x4) or "larger" connectors (e.g., x16, x32, etc.) may be implemented as the connectors 708b and 708c according to the teachings of the present disclosure while remaining within its scope.

In an embodiment, the chassis 702 may house an expansion device 710 that may be configured to perform at least one function for an LCS, which as discussed above may include function(s) that are not available from the orchestrator device 708 in some examples, and may include function(s) that are available from the orchestrator device 708 but offloaded from the orchestrator device 708 by the expansion device 710 in other examples. FIG. 7 illustrates the expansion device 710 including one or more expansion components 710a that one of skill in the art in possession of the present disclosure will appreciate may be configured to perform the function(s) discussed above, but one of skill in the art in possession of the present disclosure will appreciate how the expansion device 710 may include any of a variety of hardware/components to provide any of a variety of expansion functionality while remaining within the scope of the present disclosure as well.

In specific examples, the expansion component(s) 710a in the expansion device 710 may include Field Programmable Gate Array (FPGA) devices, networking devices, storage controllers (e.g., NEVOX® Non-Volatile Memory express (NVMe) storage controllers available from MARVEL® Semiconductor Inc. of Santa Clara, California, United States), and/or other components that would be apparent to one of skill in the art in possession of the present disclosure. In the example illustrated in FIG. 7, the expansion device 710 also includes a connector 710b that is configured to connect to the first expansion connector 706e on the secondary circuit board 706. In specific examples, the connector 710b may be provided by a PCIe connector that extends from a circuit board in the expansion device 710, with the connector 710b coupled via circuit board traces 710c in the circuit board in the expansion device 710 to the expansion component(s) 710a.

As discussed above, size constraints on the orchestrator device 708 may present issues with the ability to the configure the orchestrator device 708 with all the functionality that an operating system for an LCS (e.g., provided by the host processing system 704a) or workload performed by an LCS might require, and thus the expansion device 710 may be configured with any such functionality in order to provide that functionality to the operating system for the LCS or the workload performed by that LCS. The resource system 700 illustrated in FIG. 7 addresses the issues discussed above in conventional LCSs that require the coupling of an orchestrator device to a motherboard in a BMS system via a first riser card, the coupling of an expansion device to the motherboard in the BMS system via a second riser card, and the cabling together the orchestrator device and the expansion device, in order to enable such expanded functionality for the orchestrator device/LCS.

As will be appreciated by one of skill in the art in possession of the present disclosure, embodiments of the secondary circuit board 706 provide a riser card with a x16 PCIe connector (e.g., the orchestrator connector subsystem discussed above) that connects to the orchestrator device 708, with a first x8 connection bifurcated from that x16 connector (e.g., the orchestrator connector 706b) and coupled via secondary circuit board traces 706d to a PCIe connection (e.g., provided by the connectors 704b and 706a) to the motherboard (e.g., the primary circuit board 704) and the host processing system 704a, and with a second x8 connection bifurcated from that x16 connector (e.g., the orchestrator connector 706c) coupled via secondary circuit board traces 706f to a PCIe connection (e.g., provided by the first expansion connector 706e and the connector 710b) to the expansion device 710. As such, the expansion device 710 may be directly connected to the orchestrator device 708 without the need for the cabling required in conventional resource systems/LCSs, enabling the expansion device 710 to the perform functionality that is not available from the orchestrator device 708, or that it offloads from the orchestrator device 708.

However, while a specific resource system 700 providing the LCS orchestrator device/expansion device secondary circuit board system of the present disclosure has been illustrated and described, one of skill in the art in possession of the present disclosure will recognize that the LCS orchestrator device/expansion device secondary circuit board system of the present disclosure may include a variety of components and/or component configurations for providing the benefits described herein while remaining within the scope of the present disclosure as well.

Figure 8:
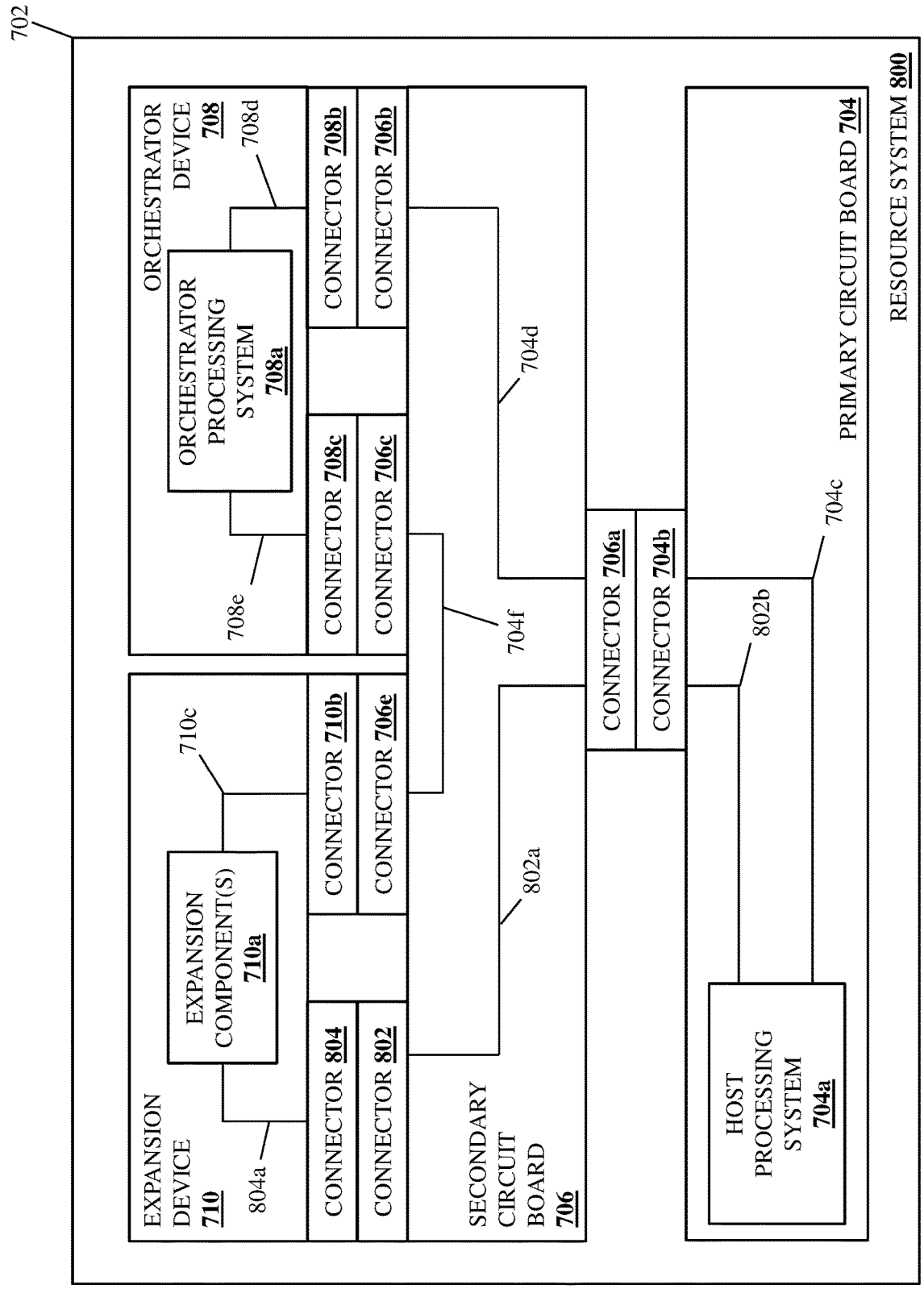
FIG. 8 is a schematic view illustrating an embodiment of the resource system of FIG. 4 including the LCS orchestrator device/expansion device secondary circuit board system of the present disclosure.

For example, FIG. 8 illustrates a resource system 800 that is configured to provide the LCS orchestrator device/expansion device secondary circuit board system of the present disclosure, with the resource system 800 presenting some modifications to the resource system 700 discussed above with reference to FIG. 7. As such, similar elements in the resource systems 700 and 800 are provided the same numbering in FIGS. 7 and 8. As can be seen in FIG. 8, the secondary circuit board 706 in the chassis 702 of the resource system 800 includes a "second expansion" connector 802 that, in specific examples, may be provided by a Peripheral Component Interconnect express (PCIe) connector that is mounted to the secondary circuit board 706 and coupled via circuit board traces 802a in the secondary circuit board 704 to the primary connector 706a, with the primary circuit board 704 including circuit board traces 702b that couple the portion of the connector 704b that is coupled to the circuit board traces 802a to the host processing system 704a. In the embodiments described below, the secondary circuit board 706 in FIG. 8 includes an expansion connector subsystem provided by a x16 connector that has been bifurcated to provide two x8 connections that provide the first expansion connector 706e and the second expansion connector 802, although one of skill in the art in possession of the present disclosure will appreciate how "smaller" connectors (e.g., x8 or x4) or "larger" connectors (e.g., x32, x64, etc.) may be implemented as the expansion connector subsystem and bifurcated (or provided as separate connectors) according to the teachings of the present disclosure while remaining within its scope.

As can also be seen in FIG. 8, the expansion device 710 may also include a connector 804 that is configured to connect to the second expansion connector 802 on the secondary circuit board 706. In specific examples, the connector 804 may be part of a connector subsystem with the connector 710b, and may be provided by a PCIe connector that extends from a circuit board in the expansion device 710, with the connector 804 coupled via circuit board traces 804a in the circuit board in the expansion device 710 to the expansion component(s) 710a. As discussed in further detail below, the configuration of the resource system 800 allows the expansion device 710 to further offload functionality from the orchestrator device 708 via its direct connection to the host processing system 704a (e.g., provided via the connectors 802/804 and the connectors 706a/704b). Thus, one of skill in the art in possession of the present disclosure will appreciate how the LCS orchestrator device/expansion device secondary circuit board system may be modified in a variety of manners that will fall within the scope of the present disclosure.

Figure 9:
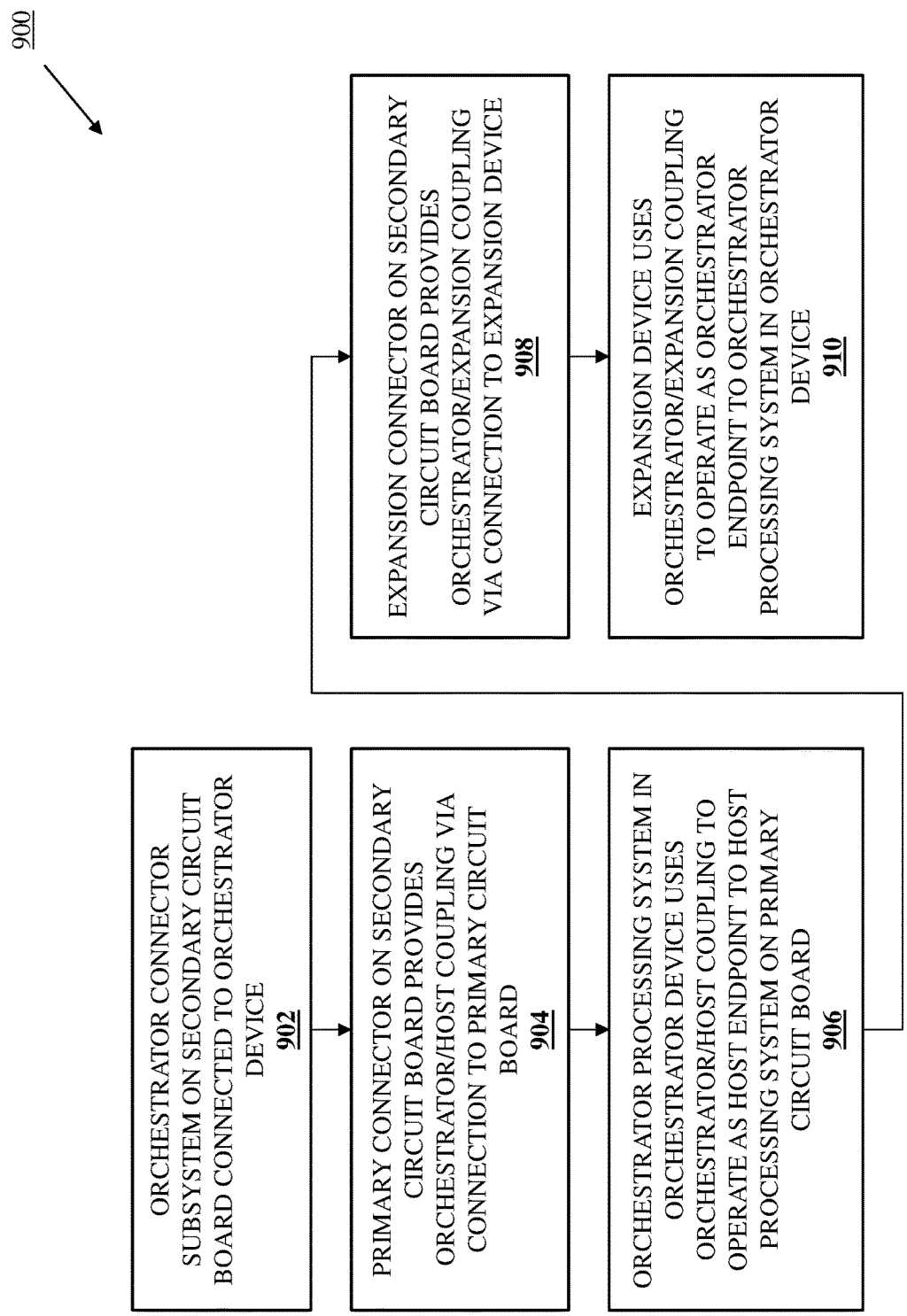
FIG. 9 is a flow chart illustrating an embodiment of a method for coupling an LCS orchestrator device and an expansion device to a primary circuit board using a secondary circuit board.

Referring now to FIG. 9, an embodiment of a method 900 for coupling a Logically Composed System (LCS) orchestrator device and an expansion device to a primary circuit board using a secondary circuit board is illustrated. As discussed below, the systems and methods of the present disclosure provide the ability to directly connect an LCS orchestrator device directly to both a host processing system and an expansion device without the need for cabling. For example, the LCS orchestrator device/expansion device secondary circuit board system of the present disclosure may include a secondary circuit board having an orchestrator connector subsystem connected to an orchestrator processing system that performs orchestration for an LCS. A primary connector on the secondary circuit board connects to a host processing system that provides an operating system for the LCS, and is coupled via the secondary circuit board to a first orchestrator connector in the orchestrator connector subsystem to provide an orchestrator/host coupling used by the orchestrator processing system to provide a host endpoint to the host processing system. An expansion connector on the secondary circuit board connects to an expansion device that performs function(s) for the LCS, with the expansion connector coupled via the secondary circuit board to a second orchestrator connector in the orchestrator connector subsystem to provide an orchestrator/expansion coupling used by the expansion device to provide an orchestrator endpoint to the orchestrator processing system. As such, expansion devices that provide different functionality may be interchanged with any particular orchestrator device depending on the needs of the LCS/workloads being performed, and without the added complexity and costs associating with cabled connections.

The method 900 begins at block 902 where an orchestrator connector subsystem on a secondary circuit board is connected to an orchestrator device. With reference to FIG. 7 or 8, during or prior to the method 900, the secondary circuit board 706 may be connected to the primary circuit board 704 by positioning the secondary circuit board 706 adjacent the primary circuit board 704 with the primary connector 706a on the secondary circuit board 706 aligned with the connector 704b on the primary circuit board 704, and moving the secondary circuit board 706 towards the primary circuit board 704 such that the primary connector 706a on the secondary circuit board 706 engages with the connector 704b on the primary circuit board 704. To provide a specific example, a riser card provided by the secondary circuit board 706 may be connected to a motherboard provided by the primary circuit board 704 via PCIe connectors provided by the primary connector 706a and the connector 704b.

With reference to FIG. 7 or 8, in an embodiment of block 902, the orchestrator device 708 may then be connected to the secondary circuit board 706 by positioning the orchestrator device 708 adjacent the secondary circuit board 706 with the connector subsystem provided by the connectors 708b and 708c on the orchestrator device 708 aligned with the orchestrator connector subsystem provided by the orchestrator connectors 706b and 706c, respectively, on the secondary circuit board 706, and moving the orchestrator device 708 towards the secondary circuit board 706 such that the connector subsystem/connectors 708b and 708c on the orchestrator device 708 engage with the orchestrator connector subsystem/orchestrator connectors 706b and 706c on the secondary circuit board 706. Continuing with the specific example above, an SCP device or DPU device provided by the orchestrator device 708 may be connected to the riser card provided by the secondary circuit board 706 via PCIe connectors provided by the connector subsystem on the SCP device or DPU device and the orchestrator connector subsystem on the riser card.

Figure 10:
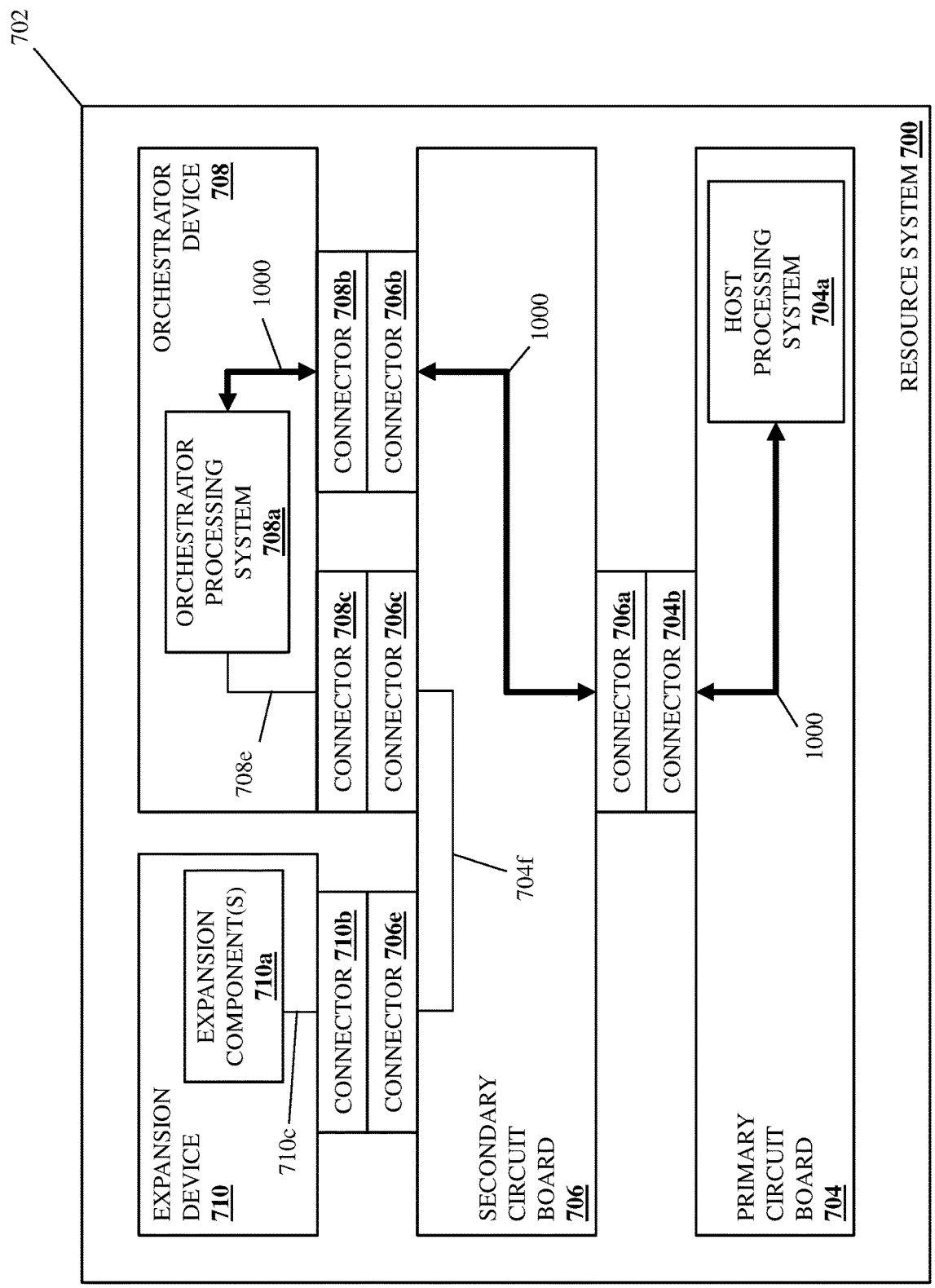
FIG. 10 is a schematic view illustrating an embodiment of the resource system of FIG. 7 operating during the method of FIG. 9.

The method 900 then proceeds to block 904 where a primary connector on the secondary circuit board provides an orchestrator/host coupling via connection to a primary circuit board. With reference to FIG. 10, in an embodiment of block 904, the primary connector 706a on the secondary circuit board 706 provides an orchestrator/host coupling 1000 via its connection to the primary circuit board 704 discussed above. For example, FIG. 10 illustrates how the orchestrator/host coupling 1000 may be provided by the circuit board traces 708d in the orchestrator device 708 between the orchestrator processing system 708a and the connector 708b, the connection of the connector 708b on the orchestrator device 708 to the orchestrator connector 706b on the secondary circuit board 706, the circuit board traces 706d on the secondary circuit board 706 between the orchestrator connector 706b and the primary connector 706a, the connection of the primary connector 706a on the secondary circuit board 706 and the connector 704b on the primary circuit board 704, and the circuit board traces 704c on the primary circuit board 704 between the connector 704b and the host processing system 704a.

Continuing with the specific example above, the riser card provided by the secondary circuit board 706 provides the orchestrator/host coupling 1000 between the SCP device or DPU device provided by the orchestrator device 708 and the x86 processor provided by the host processing system 704a via PCIe connections to the SCP device or DPU device and the motherboard provided by the primary circuit board 704. However, while the example provided in FIG. 10 illustrates the provisioning of the orchestrator/host coupling in the resource system 700 discussed above with reference to FIG. 7, one of skill in the art in possession of the present disclosure will appreciate how the resource system 800 discussed above with reference to FIG. 8 may provide an orchestrator/host coupling in a substantially similar manner while remaining within the scope of the present disclosure as well.

The method 900 then proceeds to block 906 where an orchestrator processing system in the orchestrator device uses the orchestrator/host coupling to operate as a host endpoint to a host processing system on the primary circuit board. With continued reference to FIG. 10, in an embodiment of block 906, the orchestrator processing system 708a in the orchestrator device 708 may utilize the orchestrator/host coupling 1000 to operate as a host endpoint to the host processing system 704a on the primary circuit board 704. In a specific example, at block 906 the orchestrator processing system 708a in the orchestrator device 708 may present itself as a virtual NVMe storage device to the host processing system 704a via the orchestrator/host coupling 1000, which one of skill in the art in possession of the present disclosure will appreciate provides a host endpoint for the host processing system 704a.

As discussed above, the orchestrator device 708 may be coupled to a plurality of physical NVMe storage devices (e.g., physical NVMe storage devices included in the resource system 700, physical NVMe storage devices coupled to the orchestrator device 708 via a network, etc.), and thus the presentation of itself as a virtual NVMe storage device to the host processing system 704a via the orchestrator/host coupling 1000 allows the orchestrator processing system 708a in the orchestrator device 708 to transmit data between the host processing system 704a and the physical NVMe storage devices, with the host processing system 704a viewing those data transmissions as being performed between itself and the virtual NVMe storage device presented by the orchestrator processing system 708a/orchestrator device 708. However, while a specific use of the orchestrator/host coupling 1000 has been described, one of skill in the art in possession of the present disclosure will appreciate that the orchestrator processing system 708a in the orchestrator device 708 may utilize the orchestrator/host coupling 1000 in a variety of manners that will fall within the scope of the present disclosure as well. Similarly as discussed above, while the example provided in FIG. 10 illustrates the utilization of the orchestrator/host coupling in the resource system 700 discussed above with reference to FIG. 7, one of skill in the art in possession of the present disclosure will appreciate how a similar orchestrator/host coupling provided in the resource system 800 discussed above with reference to FIG. 8 may be utilize in a substantially similar manner while remaining within the scope of the present disclosure as well.

The method 900 then proceeds to block 908 where an expansion connector on the secondary circuit board provides an orchestrator/expansion coupling via connection to an expansion device. With reference to FIG. 7 or 8, during or prior to block 908, the expansion device 710 may be connected to the secondary circuit board 706 by positioning the expansion device 710 adjacent the secondary circuit board 706 with the connector 710b on the expansion device 710 aligned with the first expansion connector 706e on the secondary circuit board 706, and moving the expansion device 710 towards the secondary circuit board 706 such that the connector 710b on the expansion device 710 engages with the first expansion connector 706e on the secondary circuit board 706. Continuing with the specific example above, the expansion device 710 may be connected to the riser card provided by the secondary circuit board 706 via PCIe connectors provided by the connector 710b on the expansion device 710 and the first expansion connector 706e on the riser card.

With reference to FIG. 8, during or prior to block 908, the positioning the expansion device 710 adjacent secondary circuit board 706 as discussed above may also align the connector 804 on the expansion device 710 with the second expansion connector 802 on the secondary circuit board 706, and the movement of the expansion device 710 towards the secondary circuit board 706 may also cause the connector 804 on the expansion device 710 to engage with the second expansion connector 802 on the secondary circuit board 706. Continuing with the specific example above, the connection of the expansion device 710 to the riser card provided by the secondary circuit board 706 may also connect the expansion device 710 to the motherboard provided by the primary circuit board 704 via PCIe connections provided by the connector 804 on the expansion device 710 and the expansion connector 802 on the riser card, as well as the connector 706a on the riser card and the connector 704b on the motherboard.

Furthermore, while described above as occurring in a particular order, one of skill in the art in possession of the present disclosure will appreciate how the connection of the orchestrator device 708 to the secondary circuit board 706 at block 902 and the connection of the expansion device 710 to the secondary circuit board 706 during or prior to block 908 may be performed in a different order (e.g., connecting the expansion device 710 to the secondary circuit board 706 before the orchestrator device 708) or at substantially the same time while remaining within the scope of the present disclosure.

Figure 11:
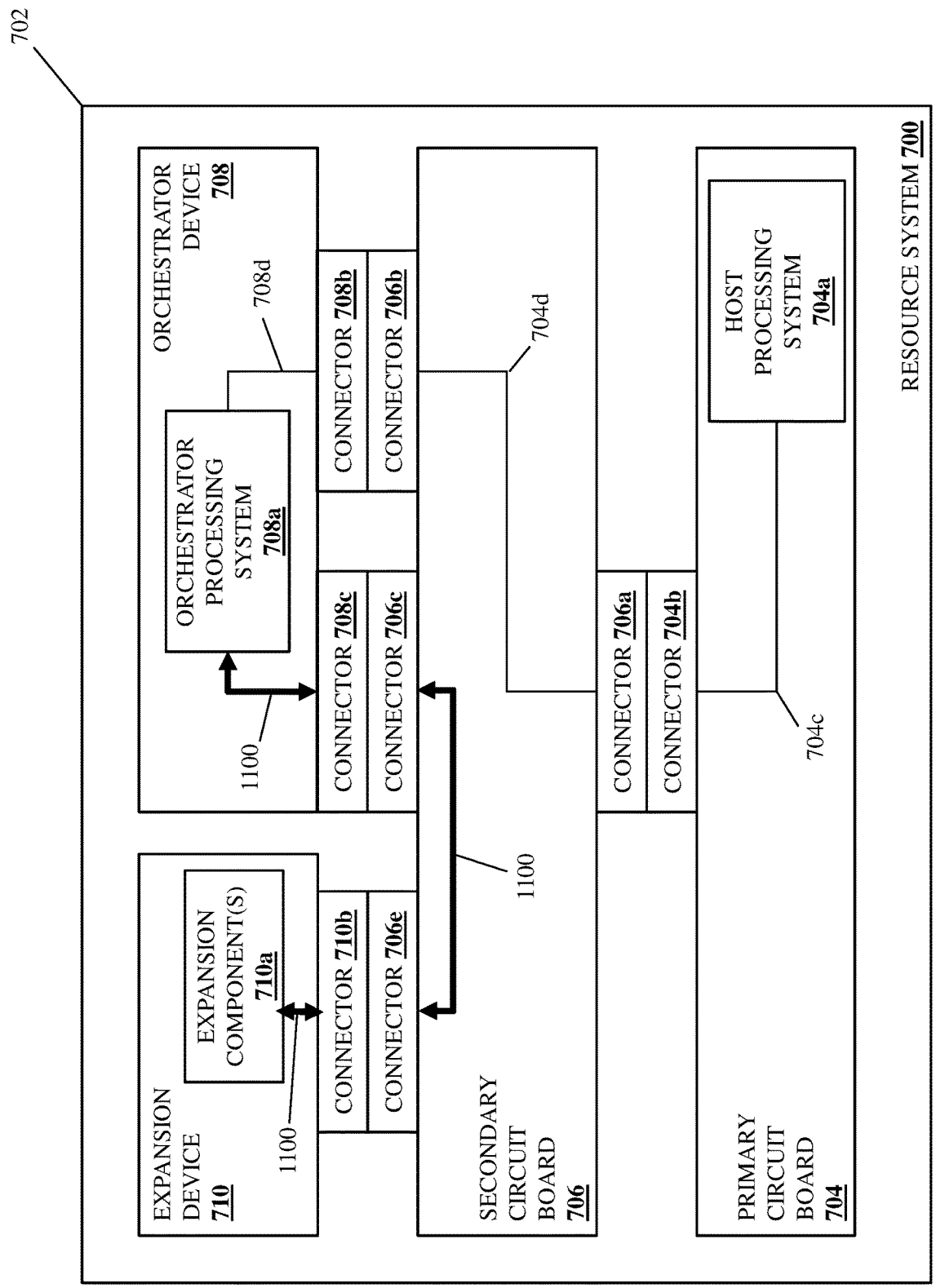
FIG. 11 is a schematic view illustrating an embodiment of the resource system of FIG. 7 operating during the method of FIG. 9.

With reference to FIG. 11, in an embodiment of block 908, the first expansion connector 706e on the secondary circuit board 706 provides an orchestrator/expansion coupling 1100 via its connection to the expansion device 710 discussed above. For example, FIG. 11 illustrates how the orchestrator/expansion coupling 1100 may be provided by the circuit board traces 710c in the expansion device 710 between the expansion component(s) 710a and the connector 710b, the connection of the connector 710b on the expansion device 710 to the first expansion connector 706e on the secondary circuit board 706, the circuit board traces 706f on the secondary circuit board 706 between the first expansion connector 706e and the orchestrator connector 706c, the connection of the orchestrator connector 706c on the secondary circuit board 706 and the connector 708c on the orchestrator device 708, and the circuit board traces 708e on the orchestrator device 708 between the connector 708c and the orchestrator processing system 708a.

Continuing with the specific example above, the riser card provided by the secondary circuit board 706 provides the orchestrator/expansion coupling 1100 between the SCP device or DPU device provided by the orchestrator device 708 and the expansion device 710 via PCIe connections to the SCP device or DPU device and the expansion device 710. However, while the example provided in FIG. 10 illustrates the provisioning of the orchestrator/expansion coupling in the resource system 700 discussed above with reference to FIG. 7, one of skill in the art in possession of the present disclosure will appreciate how the resource system 800 discussed above with reference to FIG. 8 may provide an orchestrator/expansion coupling in a substantially similar manner while remaining within the scope of the present disclosure as well.

The method 900 then proceeds to block 910 where an expansion device uses the orchestrator/expansion coupling to operate as an orchestrator endpoint to an orchestrator processing system in the orchestrator device. With continued reference to FIG. 11, in an embodiment of block 910, the orchestrator processing system 708a in the orchestrator device 708 may utilize the orchestrator/expansion coupling 1100 to operate as an orchestrator endpoint to the orchestrator processing system 708a on the orchestrator device 708. Continuing with the specific example above, at block 910, the expansion component(s) 710a in the expansion device 710 may perform NVMe storage device functionality for the orchestrator processing system 708a via the orchestrator/expansion coupling 1100, which one of skill in the art in possession of the present disclosure will appreciate provides an orchestrator endpoint for the orchestrator processing system 708a.

As discussed above, the orchestrator device 708 may be coupled to a plurality of physical NVMe storage devices and may present itself as a virtual NVMe storage device to the host processing system 704a via the orchestrator/host coupling 1000 in order to allow the orchestrator processing system 708a in the orchestrator device 708 to transmit data between the host processing system 704a and the physical NVMe storage devices, with the host processing system 704a viewing those data transmissions as being performed between itself and the virtual NVMe storage device presented by the orchestrator processing system 708a/orchestrator device 708. In addition, the orchestrator processing system 708a in the orchestrator device 708 may utilize the expansion device 710 operating as the orchestrator endpoint device via the orchestrator/expansion coupling 1100 in order to have the expansion device 710 perform encryption operations associated with data stored in those physical NVMe storage devices, compression operations associated with data stored in those physical NVMe storage devices, and/or any other NVMe storage operations that would be apparent to one of skill in the art in possession of the present disclosure.

Similarly as discussed above, while a specific use of the orchestrator/expansion coupling 1100 has been described, one of skill in the art in possession of the present disclosure will appreciate that the orchestrator processing system 708a in the orchestrator device 708 may utilize the expansion device 710 via orchestrator/expansion coupling 1100 in a variety of manners that will fall within the scope of the present disclosure as well. Also similarly as discussed above, while the example provided in FIG. 10 illustrates the utilization of the orchestrator/expansion coupling in the resource system 700 discussed above with reference to FIG. 7, one of skill in the art in possession of the present disclosure will appreciate how the orchestrator/expansion coupling in the resource system 800 discussed above with reference to FIG. 8 may be utilized in a substantially similar manner while remaining within the scope of the present disclosure as well. As such, one of skill in the art in possession of the present disclosure will appreciate how the configuration of the resource system 700 described above with reference to FIG. 7 allows the expansion device 710 to be provided in the resource system 700 in order to perform functionality that is not available from the orchestrator device 708, in order to offload functionality from the orchestrator device 708, and/or perform expansion functionality in a variety of other scenarios that would be apparent to one of skill in the art in possession of the present disclosure.

Figure 12:
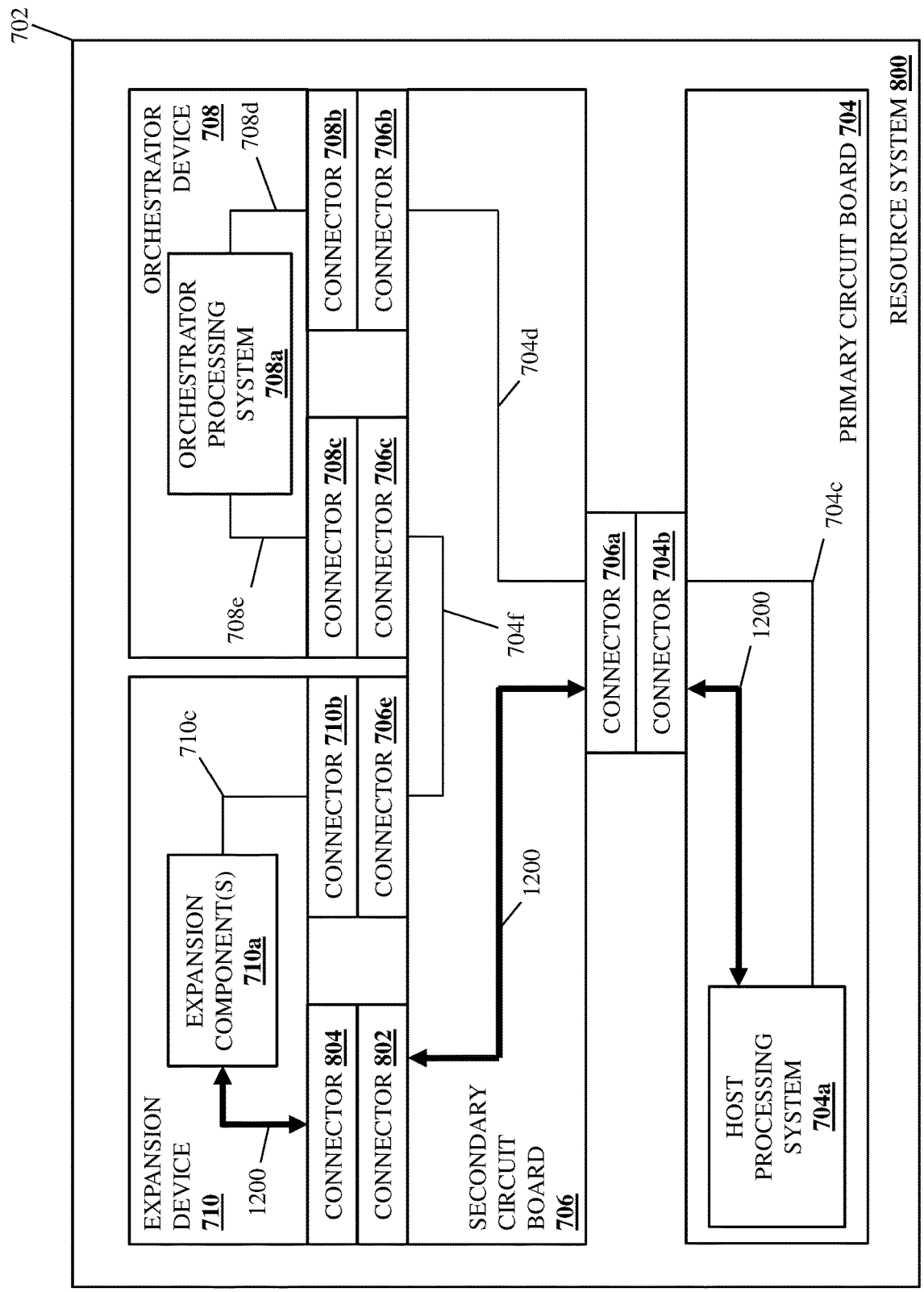
FIG. 12 is a schematic view illustrating an embodiment of the resource system of FIG. 8 operating to provide functionality not identified in the method of FIG. 9.

With reference to FIG. 12, an embodiment of the use of the resource system 800 to provide yet further expanded functionality for the resource system 800/LCS is illustrated. For example, such expanded functionality may be enabled via the second expansion connector 802 on the secondary circuit board 706 providing an expansion/host coupling 1200 via its connection to the expansion device 710 as discussed above. For example, FIG. 12 illustrates how the expansion/host coupling 1200 may be provided by the circuit board traces 804a in the expansion device 710 between the expansion component(s) 710a and the connector 804, the connection of the connector 804 on the expansion device 710 to the second expansion connector 802 on the secondary circuit board 706, the circuit board traces 802a on the secondary circuit board 706 between the second expansion connector 802 and primary connector 706a, the connection of the primary connector 706a on the secondary circuit board 706 and the connector 704b on the primary circuit board 704, and the circuit board traces 802b on the primary circuit board 704 between the connector 704b and the host processing system 704a. Continuing with the specific example above, the PCIe connections provided between the expansion device 710, the riser card provided by the secondary circuit board 706, and the motherboard provided by the primary circuit board 704, provide the expansion/host coupling 1200 between the expansion device 710 and the x86 processor provided by the host processing system 704a.

With continued reference to FIG. 12, in an embodiment, the expansion device 710 may utilize the expansion/host coupling 1200 to operate as a host endpoint to the host processing system 704a on the primary circuit board 704. In a specific example, the expansion device 710 may present itself as a virtual NVMe storage device to the host processing system 704a via the expansion/host coupling 1200, which one of skill in the art in possession of the present disclosure will appreciate provides a host endpoint for the host processing system 704a. Similarly as discussed above for the orchestrator device 708, the expansion device 710 may be coupled to a plurality of physical NVMe storage devices (e.g., physical NVMe storage devices included in the resource system 700, physical NVMe storage devices coupled to the orchestrator device 708 via a network, etc.), and thus the presentation of itself as a virtual NVMe storage device to the host processing system 704a via the expansion/host coupling 1200 allows the expansion device 710 to transmit data between the host processing system 704a and the physical NVMe storage devices, with the host processing system 704a viewing those data transmissions as being performed between itself and the virtual NVMe storage device presented by the expansion device 710.

Furthermore, the expansion device 710 may also operate similarly as described above to perform encryption operations associated with data stored in those physical NVMe storage devices, compression operations associated with data stored in those physical NVMe storage devices, and/or any other NVMe storage operations that would be apparent to one of skill in the art in possession of the present disclosure. As such, the provisioning of the expansion/host coupling 1200 for the expansion device 710 may allow the expansion device 710 to completely offload any particular functionality from the orchestrator device 708 (e.g., the NVMe functionality described above as being provided to the host processing system 704a in FIGS. 10 and 11), thus allowing the orchestrator device 708 to perform other orchestration operations that would be apparent to one of skill in the art in possession of the present disclosure. However, while a specific use of the expansion/host coupling 1200 has been described, one of skill in the art in possession of the present disclosure will appreciate that the expansion device 710 may utilize the expansion/host coupling 1200 in a variety of manners that will fall within the scope of the present disclosure as well.

Thus, systems and methods have been described that provide the ability to directly connect an LCS SCP device directly to both a x86 host processor and an expansion device without the need for cabling. For example, the LCS SCP device/expansion device riser card system of the present disclosure may include a riser card having an SCP device connector subsystem connected to an SCP processing system that performs orchestration for an LCS. A motherboard connector on the riser card connects to a x86 processor that provides an operating system for the LCS, and is coupled via the riser board to a first SCP device connector in the SCP connector subsystem to provide an SCP device/host coupling used by the SCP processing system to provide a host endpoint to the x86 processor. An expansion connector on the riser card connects to an expansion device that performs function(s) for the LCS, with the expansion connector coupled via the riser card to a second SCP device connector in the SCP device connector subsystem to provide an SCP/expansion coupling used by the expansion device to provide an SCP endpoint to the SCP processing system. As such, expansion devices that provide different functionality may be interchanged with any particular SCP device depending on the needs of the LCS/workloads being performed, and without the added complexity and costs associating with cabled connections.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Logically Composed System (LCS) orchestrator device/expansion device secondary circuit board system, comprising:
    a secondary circuit board;
    an orchestrator connector subsystem that is included on the secondary circuit board and that is configured to connect to an orchestrator device including an orchestrator processing system that performs orchestration operations for a Logically Composed System (LCS);
    a primary connector that is included on the secondary circuit board and that is configured to connect to a primary circuit board including a host processing system that provides an operating system for the LCS, wherein the primary connector is also coupled via the secondary circuit board to a first orchestrator connector in the orchestrator connector subsystem to provide an orchestrator/host coupling that is configured for use by the orchestrator processing system to operate as a host endpoint to the host processing system; and a first expansion connector that is included on the secondary circuit board and that is configured to connect to an expansion device that performs at least one function for the LCS, wherein the first expansion connector is also coupled via the secondary circuit board to a second orchestrator connector in the orchestrator connector subsystem to provide an orchestrator/expansion coupling that is configured for use by the expansion device to operate as an orchestrator endpoint to the orchestrator processing system.

2. The system of claim 1, wherein the orchestrator connector subsystem is bifurcated to provide the first orchestrator connector and the second orchestrator connector.

3. The system of claim 2, wherein orchestrator connector subsystem is a x16 connector, the first orchestrator connector is a x8 connector, and the second orchestrator connector is a x8 connector.

4. The system of claim 1, wherein at least one function performed for the LCS by the expansion device is not available from the orchestrator device.

5. The system of claim 1, wherein primary circuit board is a motherboard, and wherein the secondary circuit board is a riser card.

6. The system of claim 1, wherein each of the primary connector, the first orchestrator connector, the second orchestrator connector, and the first expansion connector are Peripheral Component Interconnect express (PCIe) connectors.

7. An Information Handling System (IHS), comprising:
a primary circuit board including a host processing system that provides an operating system for a Logically Composed System (LCS);
an orchestrator device including an orchestrator processing system that performs orchestration operations for the LCS;
an expansion device that performs at least one function for the LCS; and
a secondary circuit board that includes:
an orchestrator connector subsystem that is connected to the orchestrator device;
a primary connector that is connected to the primary circuit board and coupled via the secondary circuit board to a first orchestrator connector in the orchestrator connector subsystem to provide an orchestrator/host coupling used by the orchestrator processing system to operate as a host endpoint to the host processing system; and
a first expansion connector that is connected to the expansion device and coupled via the secondary circuit board to a second orchestrator connector in the orchestrator connector subsystem to provide an orchestrator/expansion coupling used by the expansion device to operate as an orchestrator endpoint to the orchestrator processing system.

8. The IHS of claim 7, wherein the orchestrator connector subsystem is bifurcated to provide the first orchestrator connector and the second orchestrator connector.

9. The IHS of claim 8, wherein the orchestrator connector subsystem is a x16 connector, the first orchestrator connector is a x8 connector, and the second orchestrator connector is a x8 connector.

10. The IHS of claim 7, wherein the at least one function performed for the LCS by the expansion device is not available from the orchestrator device.

11. The IHS of claim 7, wherein the primary circuit board is a motherboard, and wherein the secondary circuit board is a riser card.

12. The IHS of claim 7, wherein the secondary circuit board includes a second expansion connector that is connected to the expansion device and coupled via the primary circuit board to the host processing system.

13. The IHS of claim 8, wherein the orchestrator processing system is configured to:
present a virtual Non-Volatile Memory express (NVMe) storage device to the host processing system for at least one physical NVMe storage device coupled to the orchestrator device; and
utilize the at least one function performed by the expansion device on data stored in the at least one physical NVMe storage device.

14. A method for coupling a Logically Composed System (LCS) orchestrator device and an expansion device to a primary circuit board using a secondary circuit board, comprising:
connecting, by an orchestrator connector subsystem on a secondary circuit board, to an orchestrator device that is configured to perform orchestration operations for a Logically Composed System (LCS);
providing, by a primary connector on the secondary circuit board that is coupled via the secondary circuit board to a first orchestrator connector in the orchestrator connector subsystem, an orchestrator/host coupling by connecting to a primary circuit board that includes a host processing system that provides an operating system for the LCS;
operating, by an orchestrator processing system in the orchestrator device using the orchestrator/host coupling, as a host endpoint to the host processing system;
providing, by a first expansion connector on the secondary circuit board that is coupled via the secondary circuit board to a second orchestrator connector in the orchestrator connector subsystem, an orchestrator/expansion coupling by connecting to an expansion device that performs at least one function for the LCS;
operating, by the expansion device using the orchestrator/expansion coupling, as an orchestrator endpoint to the orchestrator processing system.

15. The method of claim 14, wherein the orchestrator connector subsystem is bifurcated to provide the first orchestrator connector and the second orchestrator connector.

16. The method of claim 15, wherein the orchestrator connector subsystem is a x16 connector, the first orchestrator connector is a x8 connector, and the second orchestrator connector is a x8 connector.

17. The method of claim 14, wherein the at least one function performed for the LCS by the expansion device is not available from the orchestrator device.

18. The method of claim 14, wherein the primary circuit board is a motherboard, and wherein the secondary circuit board is a riser card.

19. The method of claim 14, wherein the secondary circuit board includes a second expansion connector that is connected to the expansion device and coupled via the primary circuit board to the host processing system.

20. The method of claim 14, further comprising:
presenting, by the orchestrator processing system, a virtual Non-Volatile Memory express (NVMe) storage device to the host processing system for at least one physical NVMe storage device coupled to the orchestrator device; and utilizing, by the orchestrator processing system, the at least one function performed by the expansion device on data stored in the at least one physical NVMe storage device.

* * * * *